United States Patent Office 2,772,760
Patented Dec. 4, 1956

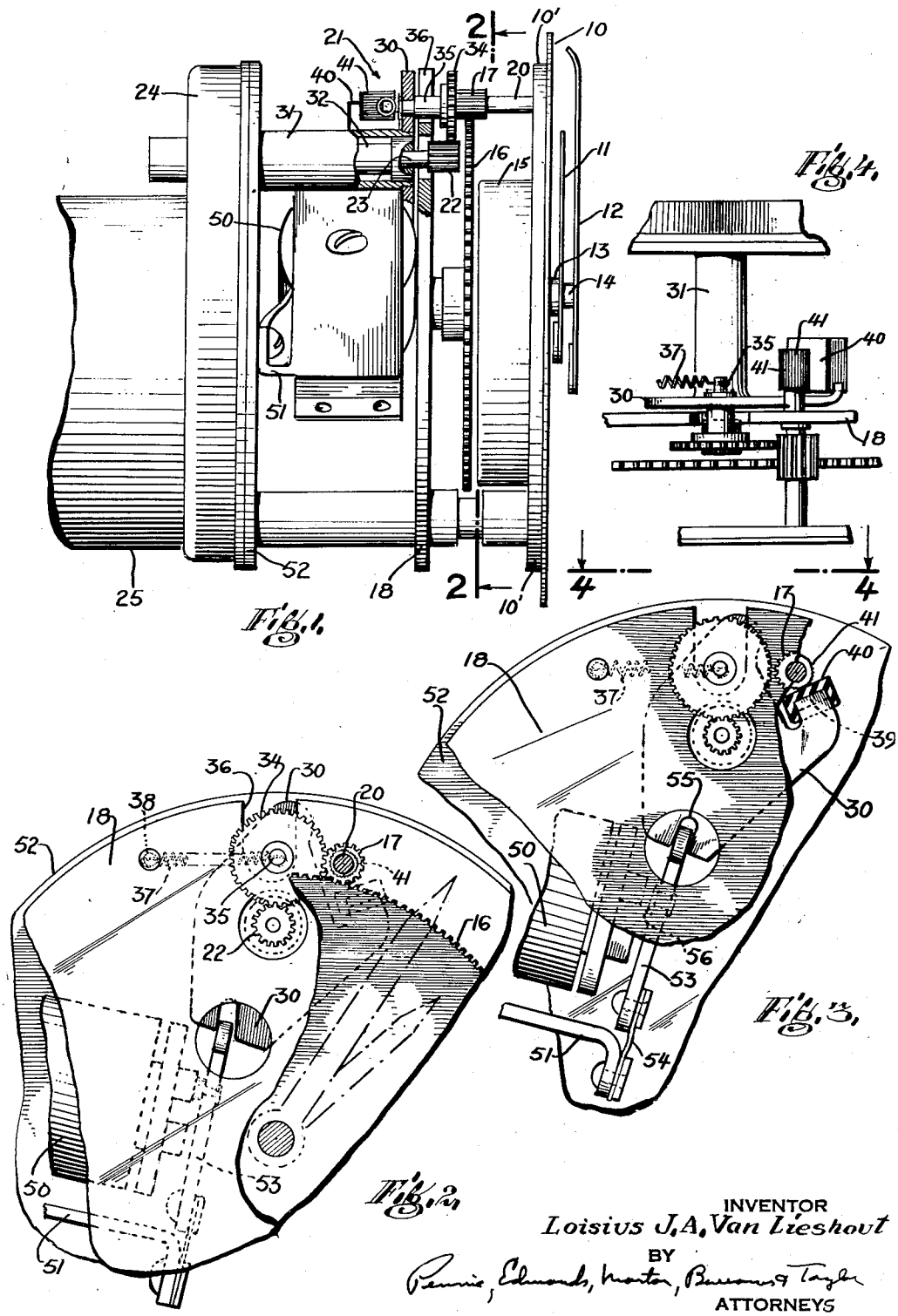

2,772,760

TRANSMISSION DEVICE

Loisius J. A. Van Lieshout, Bethlehem, Conn., assignor to Consolidated Electronics Industries Corp., Waterbury, Conn., a corporation of Delaware Application August 1, 1955, Serial No. 525,435

11 Claims. (Cl. 192—4)

This invention relates to transmission devices and particularly to such a mechanism which includes a brake for assuring a substantially instantaneous stopping of the mechanism driven through the transmission upon disengagement of the transmission. More especially the invention is concerned with a transmission device having the aforementioned braking feature for use in stop clocks.

As is well understood in the timing art, it is highly important for accuracy of timing with a stop clock or the like that initiation of the timing operation be prompt and accurately controllable, and perhaps more important that the termination of the timing period be prompt and accurately controllable in order to avoid an overriding by the driven time indicating mechanisms. It is the principal object of my invention to provide a transmission device by which both a prompter starting and a prompter and more accurate stopping can be effected than has been heretofore possible with known transmission devices.

In accordance with my invention, a transmission support member is mounted for pivotal movement and carries a transmission member which is in engagement with the driving member of the device in which the transmission device is employed. The support also carries a brake which, upon pivotal movement of the support in one direction, engages a brake member fixedly secured to the driven member of the device. The transmission member is so supported on the support with respect to the brake that when the support is pivotally moved in the other direction it engages the driven member and the brake is disengaged from the brake member. The transmission device further includes means for normally maintaining the support in its pivoted position in which the transmission member is out of engagement with the driven member and the brake is in engagement with the brake member. Additionally, of course, the transmission mechanism also includes means for pivoting the support member to its other pivoted position in which the reverse is true, namely, that the transmission member is in engagement with the driven member and the brake is disengaged from the brake member. With this arrangement the travel of both the transmission member and brake from positions of engagement to positions of disengagement may be minimal, and in fact in one advantageous form of the invention wherein the transmission member and driven member are gears, may be not substantially more than the depth to which these gears are intermeshed for driving engagement.

For a better understanding of my invention, reference may be made to the following more detailed description thereof given in connection with one form of device coming within the scope thereof and which is illustrated in the accompanying drawings in which:

Fig. 1 is a side elevation of the transmission device as applied to a stop clock;

Fig. 2 is a sectional elevation taken along line 2—2 of Fig. 1 and showing the transmission device in driving position;

Fig. 3 is a view similar to Fig. 2 but showing the device in braking condition with part thereof broken away to show more clearly the engagement of the brake with the brake member; and Fig. 4 is a fragmentary plan view on line 4—4 of Fig. 3.

In the drawings, the calibrated dial face of the stop clock is identified by the reference numeral 10 and is mounted on a front frame member 10' of the stop clock. A pair of pointers 11 and 12 are mounted on coaxial shafts 13 and 14 protruding through the center of the dial face 10 and frame member 10' from a gear box 15 supported on frame member 10' and containing conventional gearing which, among other things, provides for return of both pointers 12 and 11 to their zero positions within no more than two backward revolutions of pointer 12. In the present instance the pointer 11 is adapted to make one complete rotation in one minute, whereas pointer 12 is adapted to make one complete rotation in one second. A gear 16 driven by a pinion 17 supplies driving power to the gear box through a friction coupled shaft to which it is fixed and which extends from the rear of gear box 15 to frame member 18 of the stop clock. Pinion 17 is fixedly secured to and supported on a shaft 20 journalled at one end in frame member 10' and adjacent the other end in frame member 18.

Pinion 17 may be driven through my novel transmission device, indicated generally by the reference numeral 21 in Fig. 1, from a drive pinion 22 mounted on the end of drive shaft 23 which extends from the reduction gearing contained in housing 24 of a motor 25. Motor 25 must of course, for accuracy of operation of the stop clock, have a substantially constant output speed. Such a motor may be one of the type disclosed in A. W. Haydon Patent 2,513,410 provided with a governor of the type disclosed in A. W. Haydon Patent 2,523,298, both of which patents are assigned to the same assignee as is this application.

Turning now to the transmission device of my invention specifically, it comprises a plate 30 secured on a tubular shaft 31 adjacent the rear face of frame member 18. Tubular shaft 31 is supported for rotation upon a bushing 32 coaxial with drive shaft 23 and pinion 22. Tubular member 31 and hence plate 30 are pivotable about the axis of shaft 23. A transmission gear 34 is mounted for free rotation on a stud 35 which is in turn fixedly secured to plate 30 and extends through an opening 36 in frame member 18. Transmission gear 34 is positioned to be in driving engagement with pinion 22 and is therefore continually driven during operation of motor 25. For operation of the stop clock it is moved by pivotal movement of plate 30 about the axis of pinion 22 and shaft 23 into engagement with driven pinion 17. Such driving position of transmission gear 34 is illustrated in Fig. 2. Normally, however, transmission gear 34 is maintained out of engagement with pinion 17 by a spring 37 extending between the rear end of stud 35 and a stud 38 mounted on the rear face of frame member 18.

Supporting plate 30 is also provided with a rearwardly extending flange 39 on which is supported a brake 40 made of rubber or other similar material. Brake 40 is adapted to cooperate with a knurled or otherwise grooved brake member 41, mounted on the rear end of shaft 20 which supports driven pinion 17, upon the pivotal movement of support plate 30 for disengagement of transmission gear 34 from pinion 17. It will be apparent of course that upon pivotal movement of plate 30 in the opposite direction, that is, in a direction to engage transmission member 34 with pinion 17, brake 40 will be moved out of braking contact with brake member 41.

Pivotal movement of plate 30 is effected by a solenoid 50 supported by a bracket 51 from a frame member 52 of the stop clock, the latter being located just forward of the front of gear housing 24 of motor 25. A pivoting lever 53 mounted on a leaf spring or leaf springs 54, which are in turn secured to bracket 51, has its outer end received in a slot 55 formed in the lower end of plate 30. A non-sticking, non-magnetic rivet is carried by lever 53 to improve the release of the latter upon deenergization of the solenoid. As may be seen from Figs. 2 and 3, when the solenoid is energized (by means not shown) lever 53 is drawn toward it and effects a pivotal movement of support plate 30 in a clockwise direction which in turn, as heretofore explained, moves transmission gear 34 into engagement with pinion 17 whereby the latter is drivingly connected with output pinion 22 of motor 25. At the same time, brake 40 is moved out of engagement with brake member 41, thereby permitting pinion 17 to be freely driven by transmission gear 34. When the solenoid 50 is deenergized, spring 37 pivots support plate 30 in the opposite direction, that is, in a counterclockwise direction, to the position shown in Fig. 3, which effects a disengagement of transmission gear 34 from pinion 17 and the nearly simultaneous engagement of brake 40 with brake member 41. This effects a prompt termination of the rotation of pinion 17 and hence prevents any appreciable overriding of the pointers beyond the termination point of the period being timed.

It will be clear that by properly mounting transmission gear 34 and brake 40 on support plate 30 relative to each other and relative to fixedly positioned pinion 17, the amount of travel necessary in order to place the transmission device in driving position or in braking position can be very small indeed. As a matter of fact, it will be clear that such travel can be limited to a linear distance not substantially greater than the degree of movement of transmission gear 34 relative to pinion 17 required for proper meshing thereof. Hence the maximum distance of travel necessary can be as little as the depth of the teeth of pinion 17 plus a minimum clearance. To effect such travel in the device shown, a pivotal movement of support plate 30 of less than 5° will be sufficient.

One type of device according to this invention and substantially the same as that illustrated and described above has been manufactured in quantity with an accuracy rating of ± 10 milliseconds per 60 seconds of timing operation.

Various changes and modifications may of course be made in the specific form of the invention illustrated and described above without departing from the scope of the invention which should, rather, be limited only to the extent set forth in the appended claims.

I claim:

1. A transmission device for drivingly connecting a driving member and a driven member which comprises a support mounted for pivotal movement, a transmission member mounted on said support and in engagement with said driving member and engageable with said driven member upon pivotal movement of said support in one direction, a brake member fixedly secured to said driven member, a brake mounted on said support and engageable with said brake member upon pivotal movement of said support in the other direction, means normally maintaining said support in its pivoted position in which said brake is in engagement with said brake member and said transmission member is out of engagement with said driven member, and means for pivoting said support to a position so that said brake is out of engagement with said brake member and said transmission member is in engagement with said driven member.

2. A transmission device according to claim 1 in which said support is pivotable about the axis of said driving member and in which the transmission members is in permanent engagement with said driving member.

3. A transmission device according to claim 2 in which the angular pivotal movement of said support between its extreme positions is not more than about 5°.

4. A transmission device for drivingly connecting a driving gear and a driven gear which comprises a support mounted for pivotal movement about the axis of said driving gear, a transmission gear mounted on said support and permanently in engagement with said driving gear and engageable with said driven gear upon pivotal movement of said support in one direction, a brake member fixed on a shaft which fixedly supports thereon the driven gear, a brake mounted on the support and engageable with the brake member upon pivotal movement of the support in the other direction, means normally maintaining said support in its pivoted position in which the brake is in engagement with the brake member and the transmission gear is out of engagement with the driven gear, and means for pivoting said support to a position so that the brake is out of engagement with the brake member and the transmission gear is in engagement with the driven gear.

5. A transmission device according to claim 4 which includes spring means continually urging said support toward its pivoted position in which the brake is in engagement with the brake member.

6. A transmission device according to claim 4 which includes a solenoid and an armature, the armature being positioned to engage said support and pivot it to its position in which the brake is out of engagement with the brake member when said solenoid is energized.

7. A transmission device in accordance with claim 4 in which the brake member comprises a knurled collar.

8. A transmission device according to claim 4 which includes a tubular member coaxial with and surrounding the shaft which supports the driving gear, said support being mounted on said tubular member.

9. A transmission device according to claim 8 in which the support is a flat plate.

10. In a stop clock including a source of power, a driving gear driven from said power source, at least one pointer, and a shaft supported driven gear for turning said pointer, a transmission device for drivingly connecting the driving gear and said driven gear which comprises a support mounted for pivotal movement about the axis of said driving gear, a transmission gear mounted on said support and permanently in engagement with said driving gear and engageable with said driven gear upon pivotal movement of said support in one direction, a brake member fixed on the shaft which fixedly supports thereon the driven gear, a brake mounted on the support and engageable with the brake member upon pivotal movement of the support in the other direction, means normally maintaining said support in its pivoted position in which the brake is in engagement with the brake member and the transmission gear is out of engagement with the driven gear, and means for pivoting said support to a position so that the brake is out of engagement with the brake member and the transmission gear is in engagement with the driven gear.

11. A transmission device for drivingly connecting a shaft supported driving gear and shaft supported driven gear which comprises a tubular member coaxial with and surrounding the drive shaft of said driving gear, a support plate mounted for pivotal movement on said tubular member, a transmission gear mounted on said support plate and permanently in engagement with said driving gear and engageable with said driven gear upon pivotal movement of said support plate in one direction, a knurled collar fixed on the shaft of said driven gear, a brake mounted on said support plate and engageable with said knurled collar upon pivotal movement of the support plate in the other direction positively to stop continued rotation of the shaft supported driven gear upon disengagement of the transmission gear therefrom, spring means normally urging the support plate to its pivoted position in which the brake is in engagement with the knurled collar and the transmission gear is out of engagement with the driven gear, a solenoid, and a lever armature associated therewith and engaging the support plate to move the latter when the solenoid is energized to a position in which the brake is out of engagement with the knurled collar and the transmission gear is in engagement with the driven gear.

References Cited in the file of this patent

UNITED STATES PATENTS

| | | |
|---|---|---|
| 264,418 | Ross | Sept. 12, 1882 |
| 305,109 | Richardson | Sept. 16, 1884 |
| 505,254 | Smith | Sept. 19, 1893 |
| 1,569,298 | Powers | Jan. 12, 1926 |